(No Model.)
J. P. NOYES.
PNEUMATIC CLUTCH.
No. 369,807. Patented Sept. 13, 1887.
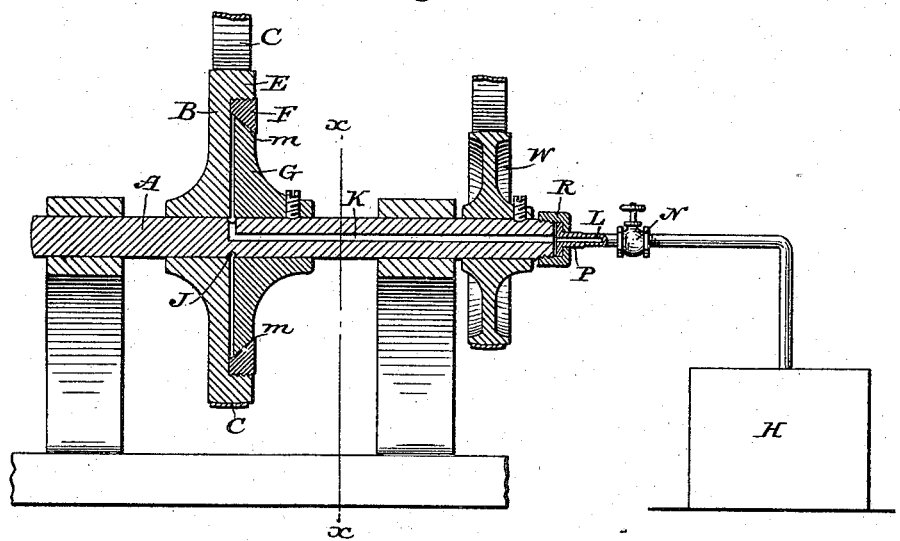
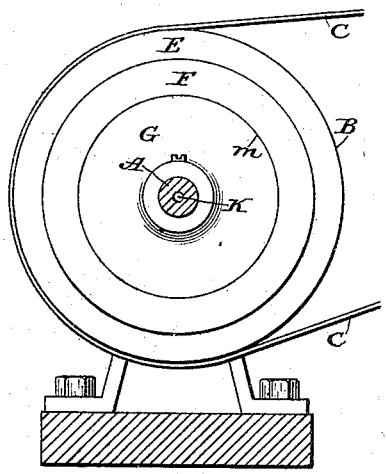
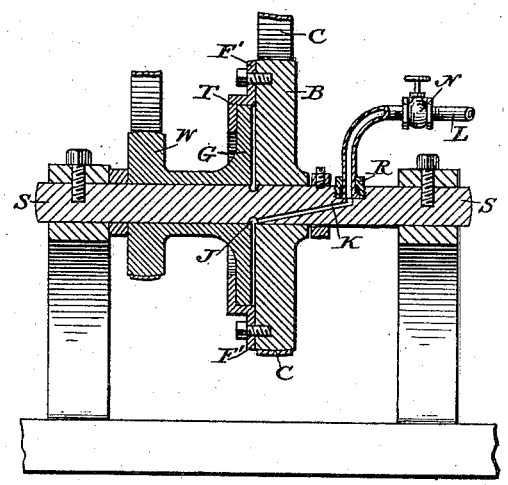
Attest:
A. N. Jesbera
S. C. Staren
Inventor:
Joseph P. Noyes
By David A. Burr
Atty.

UNITED STATES PATENT OFFICE.

JOSEPH P. NOYES, OF BINGHAMTON, NEW YORK, ASSIGNOR TO CHARLES B. FAIRCHILD AND ROSELLE H. MEAGLEY, BOTH OF SAME PLACE.

PNEUMATIC CLUTCH.

SPECIFICATION forming part of Letters Patent No. 369,807, dated September 13, 1887.

Application filed December 8, 1886. Serial No. 220,959½. (No model.)

*To all whom it may concern:*

Be it known that I, JOSEPH P. NOYES, of Binghamton, in the county of Broome and State of New York, have invented a new and useful Pneumatic Clutch or Coupling for Transmitting Motion; and I do hereby declare that the following is a full and exact description thereof, reference being had to the accompanying drawings, and to the letters of reference marked thereon, making a part of this specification, in which—

Figure 1 is a vertical longitudinal section of a rotating shaft fitted with my pneumatic clutch, whereby the coupling or uncoupling of the shaft with a driving-pulley is effected. Fig. 2 is a transverse section of the shaft in line $xx$ of Fig. 1, showing the clutch device in elevation. Fig. 3 is a vertical longitudinal section of a fixed shaft upon which are mounted pulleys to be coupled by my pneumatic clutch, illustrating a modification in its construction.

My invention relates to an improvement in couplings for shafting and pulleys used in transmitting motion, and has for its object to obtain a simple clutch under ready control, and which may be applied without shock or strain upon the machinery. By means thereof the power of compressed air is made effective in producing frictional adherence between the surfaces to be locked together, so as to create an efficient friction-clutch.

In the accompanying drawings, A represents a shaft from which power is derived or to which power is to be communicated from any form of motor.

B is a band-pulley (or an equivalent cog-wheel) mounted to revolve loosely upon the shaft A, and C is the band by which said pulley is driven.

E is an annular rim formed integrally with the pulley B to project from one face thereof at its periphery. The inner side of the rim E is threaded to receive a ring, F, adapted to screw therein, and which is formed with an inward bevel on its inner side and constitutes in effect an annular offset upon the pulley.

G is a wheel or disk mounted upon the shaft A and made fast thereto. The periphery of this disk is beveled at an angle the counterpart of the bevel on the inner side of the ring or annular offset F, and its diameter is such as that it will fit closely within said ring and form a beveled joint, $m$, therewith, as shown in Fig. 1.

In mounting the loose pulley B upon the shaft the ring F is removed therefrom. The pulley is then slipped upon the shaft until its recessed face is brought against the parallel wide face of the disk G, and the ring F is then screwed into its seat in the rim E of the pulley, so that its inner beveled rim will overlap the periphery of the disk G and form the beveled joint $m$ therewith. This joint will confine the pulley against the disk and provide for a frictional contact between them, and yet allow the independent revolution of the pulley. A very narrow space is left between the pulley and disk, and a slight play of the one to and from the other is permitted sufficient to allow the opposed surfaces in the peripheral beveled joint $m$ to move the one over the other and to be brought into close frictional contact by a separation of the pulley from the disk.

An encircling groove, J, is cut in the periphery of the shaft A immediately in front of the disk G, made fast thereto, so as to communicate freely with the space between the disk and pulley. An admission of compressed air into this space between the pulley and disk to force them apart, and thus insure the required frictional contact between the inner rim of the ring and the outer rim of the disk, is provided for by means of an aperture, K, pierced longitudinally in the shaft A from one end thereof to a point opposite the encircling groove J, with which it is made to communicate.

An air-supply pipe, L, connecting with an air-pump, or reservoir, H, of compressed air, and governed by a valve or cock, N, is fitted to the end of the shaft A to communicate with the aperture K by means of a coupling-ferrule, P, secured thereto by a cap or gland, R, screwing upon the end of the shaft, as shown in Fig. 1, and which allows a free rotation of the shaft independently of the ferrule, to which the air-pipe L is made fast.

In the operation of the device, so long as the pipe L is closed the pulley B is left free to turn idly upon the shaft A independently of the shaft and of the disk G, secured thereto; but by opening the valve N, controlling said pipe, and permitting a supply of compressed air to enter the space between the opposed faces of the pulley B and disk G from the pipe L through the passage K and annular groove J, the pressure of the air, operating to spread the pulley and disk apart, will cause the beveled rim of the disk to bear with such force against the counterpart beveled rim of the ring F on the pulley as to lock them together by reason of their frictional contact, so that the disk and pulley shall revolve together as one wheel. As the contact is a frictional one and the pressure thereon is admitted in a comparatively gradual manner, no sudden jar or shock will arise even when the two are locked during a rapid rotation of the shaft A.

In Fig. 3 a modification of the invention is shown in which the disk G and pulley B are mounted to revolve independently upon a fixed shaft, S, the air-pipe L, by which compressed air is admitted between the disk and and pulley, being connected to the side of the shaft, instead of its outer end. An annular offset is formed upon the rim of the pulley B to overlap the periphery of the disk G, with a shoulder and square joint, T, as an equivalent for the beveled joint m, (shown in Fig. 1,) and the ring F' forming said offset is bolted to the face of the pulley, thereby dispensing with a threaded rim E upon the pulley, as shown in Fig. 1.

It is evident that the pulley B, Fig. 1, may be keyed fast to the shaft A and the disk G be left free to turn loosely on said shaft; also, that a gear-wheel or band-pulley, W, may be formed upon the side of the disk G or upon a hub or collar projecting for the purpose therefrom, as shown in Fig. 3.

I am aware that it is not new to introduce compressed air or steam in a clutch mechanism between the opposite faces of a disk or wheel fixed, and of a second wheel or disk revolving loosely, upon a rotating shaft for the purpose of forcing the two apart; but my invention is novel in that when the one disk or wheel is thus forced from the other it is made to bear peripherally against an overlapping flange projecting from the larger wheel or disk, whereby the two become bound or locked together by frictional contact.

I claim as my invention—

1. The combination, with a wheel secured to a rotating shaft to move with it, of a second wheel mounted to revolve loosely upon said shaft in proximity to the face of the first, and means, substantially as described, whereby compressed air may be conveyed into the space between the two, said second wheel having an annular offset projecting from its rim to overlap more or less the face of the first, and thereby form a joint therewith which will furnish a circumferential frictional bearing between the two when they are forced apart, substantially in the manner and for the purpose herein set forth.

2. The combination, with a shaft, A, and a beveled-edge disk, G, secured thereto, of the wheel B, revolving loosely upon the shaft in proximity to the disk, said wheel being provided with an annular internally-threaded offset, E, projecting from the periphery of said disk G, and a threaded internally-beveled ring, F, screwing into the offset E to overlap the beveled edge of the disk G and form a close joint therewith, and means, substantially as described, for introducing compressed air between the opposed faces of the wheel and disk, all substantially in the manner and for the purpose herein set forth.

In testimony whereof I have signed my name to this specification in the presence of two subscribing witnesses.

JOSEPH P. NOYES.

Witnesses:
A. L. PINE,
NERI PINE.